United States Patent [19]
Lane, III

[11] 3,936,882
[45] Feb. 3, 1976

[54] ADJUSTABLE MOUNTING ARRANGEMENT FOR RECORDING HEAD

[75] Inventor: Charles E. Lane, III, Meadowbrook, Pa.

[73] Assignee: Honeywell Inc., Minneapolis, Minn.

[22] Filed: Aug. 27, 1974

[21] Appl. No.: 500,870

[52] U.S. Cl. .............................. 360/104; 360/109
[51] Int. Cl.² ...................... G11B 5/56; G11B 5/48
[58] Field of Search .......... 360/104, 109, 102, 103, 360/130; 346/145

[56] References Cited
UNITED STATES PATENTS

| | | | |
|---|---|---|---|
| 2,673,249 | 3/1954 | Ericsson | 360/104 |
| 2,742,536 | 4/1956 | Uritis | 360/109 |
| 2,769,037 | 10/1956 | Dank et al. | 360/104 |
| 2,859,084 | 11/1958 | Raddin | 360/109 |
| 3,373,248 | 3/1968 | Baybick et al. | 360/109 |
| 3,455,559 | 7/1969 | Wilson | 360/109 |

*Primary Examiner*—Alfred H. Eddleman
*Attorney, Agent, or Firm*—Arthur H. Swanson; Lockwood D. Burton; Mitchell J. Halista

[57] ABSTRACT

A mounting arrangement for a recording head provides for an adjustment of the alignment of the face of the recording head relative to a recording medium disposed in a sliding contact relationship with the face of the recording head.

5 Claims, 3 Drawing Figures

ADJUSTABLE MOUNTING ARRANGEMENT FOR RECORDING HEAD

BACKGROUND OF THE INVENTION

A. Field of the Invention

This invention relates to recording head for recording on a recording media. More specifically, the present invention is directed to a mounting arrangement for a recording head for recording on a recording medium having relative motion between the recording head and the recording surface.

B. Background of the Invention

In the field of recording it is a conventional practice to support recording, or transducer, heads utilized for recording, playback and erase such that the recording head engaging face of the head is disposed in a substantially parallel relationship to the plane of the recording medium. It is further desirable that the longitudinal, i.e., recording track, axis of the head be disposed parallel to the recording medium and in planes normal to the longitudinal, i.e., direction of motion, axis of the recording medium, such a relationship being known an azimuth alignment of the transducer head relative to the recording medium. Such a head-to-recording medium relationship is essential to ensure proper engagement between the recording medium and head and to further control the consistent positioning of the head relative to recording channels on the recording medium. Prior art mounting arrangement for transducer heads provided mounting brackets which when used in conjunction with recording transducers allow the transducer head to be adjusted relative to the recording medium. However, such prior art devices fail to provide either suitable transducer head mounting arrangements in that they either lack the accuracy desirable in a head-to-recording medium relationship or require a plurality of adjustments through adjusting screws thereby requiring a lengthy period for needed adjustments. Consequently, the prior art devices do not lend themselves to rapid and efficient assembly line techniques for manufacturing the recording instrument thereby substantially increasing the manufacturing costs associated therewith.

SUMMARY OF THE INVENTION

Accordingly, it is an object of the present invention to provide an adjustable mounting arrangement for a transducer head which simplifies the transducer head adjustment with respect to establishing a predetermined head-to-recording medium relationship.

In accomplishing this and other objects, there has been provided, in accordance with the present invention, a mounting arrangement for a transducer head including a lever having a transducer head mounted at one end of the lever. The other end of the lever is pivotally mounted and retained in a bow-tie shaped slot in a lever support block with a pivot pin passing transversely through the lever across a narrowed portion of the slot. The support block has a first end arranged as a flexure mount attached to a base member. The other end of the support block has a threaded rod passing through a non-interfering unthreaded aperture. One end of the threaded rod has a circumferential shoulder bearing on the end of the support adjacent to the aperture and a second end of the rod is threaded and is located in a matching threaded hole in a rigid plate attached to the base member.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT DETAILED DESCRIPTION

Figure 1:
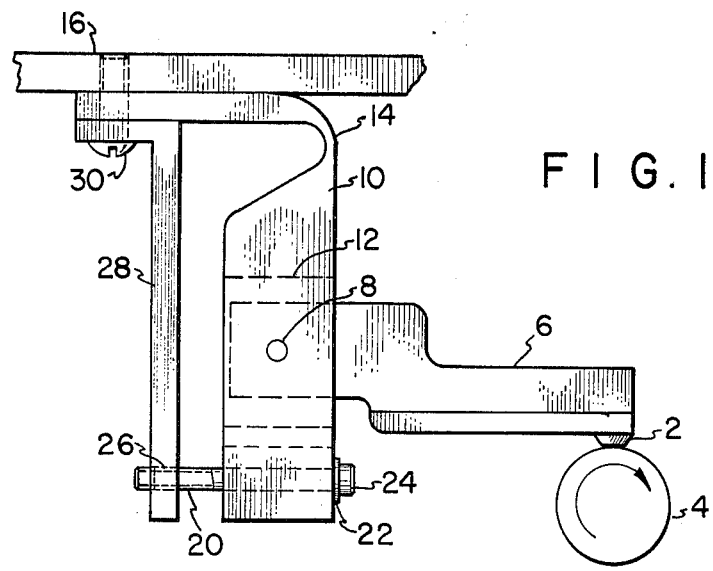
FIG. 1 is a side view of a transducer head mounting arrangement embodying the present invention.
Figure 2:
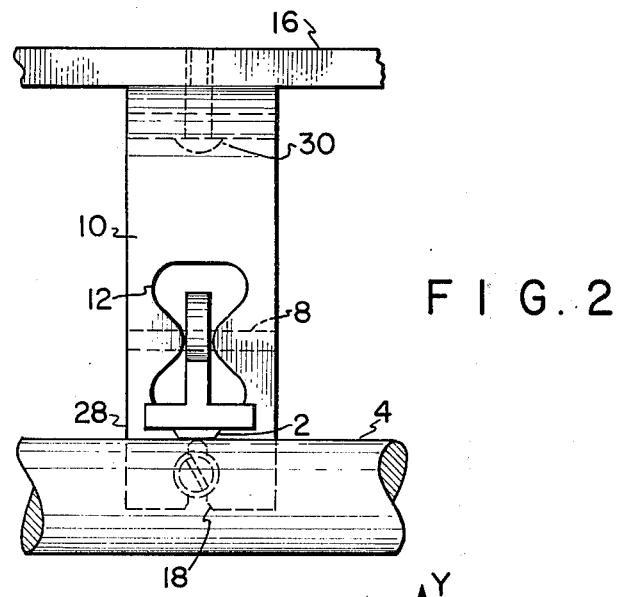
FIG. 2 is an end view of the mounting arrangement shown in FIG. 1.

Referring to FIGS. 1 and 2 in more detail, there is shown a transducer head 2 supported in a sliding contact relationship with a rotatable recording medium support drum 4. A recording medium (not shown) is arranged to pass between a recording face of the transducer head 2 and the outside surface of the support drum 4. One end of a transducer head support lever 6 is attached to the transducer head 2. The other end of the lever 6 is pivotally supported on a pivot pin 8 passing through a hole 9 in the lever 6. The ends of the pivot pin 8 are mounted in a support block 18 having a bow-tie shaped slot 12 passing therethrough. The pivot pin 8 is arranged to bridge the narrowed portion of the bow-tie shaped slot 12 with the corresponding end of the lever 6 being free of contact of the sides of the slot 12. A flexure member 14 is secured to one end of the support block to allow movement of the support block 10. The flexure member 14 is made of a resilient material, e.g., any suitable plastic material, which is attached to the support block 10 or, alternatively, the support block 10 and the flexure 14 can be an integral structure of the same resilient material. The other end of the flexure member 14 is connected to a fixed support base 16 arranged to support the mounting arrangement for the transducer head 2. The other end of the support block 10 is provided with an unthreaded recess 18 having a threaded bolt 20 passing freely therethrough. One end of the bolt 20 is provided with an expanded portion, e.g., a collar 22, bearing on the support block 10 and a screw driver slot 24 to facilitate a rotational adjustment of the bolt 20. The other end of the bolt 20 is arranged to engage a threaded hole 26 in a fixed support plate 28 connected to the support member 16 by any suitable means, e.g., a bolt 30 passing through the support plate 28 and the flexure member 14 into the support base 16.

Figure 3:
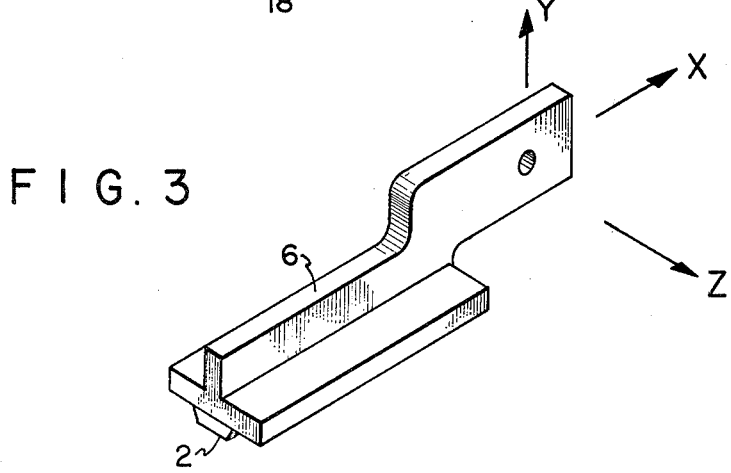
FIG. 3 is an illustration of the reference axes for a lever supporting a transducer head in the mounting arrangement of FIGS. 1 and 2.

In FIG. 3, there is shown a pictorial illustration of the lever 6 supporting the transducer head 2. Three axes of rotational movement X, Y and Z are shown with relationship to the longitudinal axis X of the lever 6. In order to provide for proper alignment of the transducer head 2 with respect to the recording medium (not shown) passing across the drum 4, the lever 6 must be able to pivot on the pivot pin 8 passing through the hole 9 which is a movement of the lever 6 about the Z axis of concurrently to allow a limited movement about the X axis of the lever 6 to position the transducer head 2 with an automatic compensation for imperfections in the recording medium and the drum 4. However, movement about the Y axis of the lever 6 must be restrained in order to prevent the transducer head 2 from leaving the recording channel on the recording medium. The threaded bolt 20 is initially used to align the transducer head 2 onto the support drum 4 whereby the movement of the lever 6 about the Z axis, i.e., the pivot pin 8, is approximately centered within the maximum permissible range of movement of the lever 6 within the slot 12. Thus, the support block 10 is selectively positioned with respect to the support plate 28 by a rotation of the screw 20 which induces a bending of the flexure 14. The narrowed portion of the bow-tie shaped slot 12 provides adjacent and confronting restraining surfaces extending for a substantial distance, or depth, into the support block 10, i.e., a distance greater than the spacing of the restraining surfaces, on both sides of the lever 6 to inhibit movement about the Y-axis. On the other hand, a movement of the lever 6 on the pivot 8 about the X axis within the limits imposed by the tolerance of the fit of the pin 8 within the hole 8 is afforded by the widened portions of the bow-tie shaped slot 12. Thus, the lever 6 and the transducer 2 are automatically positioned on the pivot pin 8 after the initial positioning by the bolt 20 to compensate for minor abnormalities in the recording drum 4 and the recording medium passing between the transducer head 2 and the recording drum 4 while maintaining the recording channel position of the transducer head 2.

Accordingly, it may be seem that there has been provided, in accordance with the present invention, an improved adjustable mounting arrangement for a transducer head which simplifies the transducer head adjustment with respect to establishing a predetermined head-to-recording medium relationship.

The embodiments of the invention in which an exclusive property or privilege is claimed are defined as follows:

1. A mounting device for a transducer head comprising:

a lever having means for mounting a transducer head at one end thereof and a transverse hole for passing a pivot pin therethrough at the other end thereof, a support block having a bow-tie shaped slot passing therethrough with the narrowed portion of the slot having confronting faces spaced apart a distance sufficient to allow the end of said lever having said transverse hole to pass therebetween, said lever having a predetermined portion of the end containing said transverse hole located between said confronting faces, a pivot pin hole passing through said support block in alignment with said confronting faces, and a pivot pin located in said pivot pin hole in said support block and extending across said narrowed portion of said bow-tie shaped slot and through said transverse hole in said lever 2. A mounting device as set forth in claim 1 and including a fixed support means and adjustable means connected between said fixed support means and said support block for adjusting the location of said support block with relationship to said fixed support means, 3. A mounting device as set forth in claim 2 wherein said adjustable means includes a threaded screw bearing on said support block and engaging a threaded hole in said fixed support.

4. A mounting device as set forth in claim 3 wherein said adjustable means includes a flexure mount for said support block located between said fixed means and an end of said support block opposite the end engaging said threaded screw.

5. A mounting device as set forth in claim 1 wherein the depth of said bow-tie shaped slot is substantially greater than the distance between said confronting faces across the narrowed portion of said slot.

\* \* \* \* \*